United States Patent [19]

Ihlemann

[11] Patent Number: 4,967,889
[45] Date of Patent: Nov. 6, 1990

[54] FLUID FRICTION CLUTCH

[75] Inventor: Arndt Ihlemann, Schweinfurt, Fed. Rep. of Germany

[73] Assignee: Fichtel & Sachs AG, Schweinfurt, Fed. Rep. of Germany

[21] Appl. No.: 285,093

[22] Filed: Dec. 15, 1988

[30] Foreign Application Priority Data

Dec. 23, 1987 [DE] Fed. Rep. of Germany ....... 3743819

[51] Int. Cl.$^5$ .............................................. F16D 35/02
[52] U.S. Cl. ................................ 192/58 B; 123/41.12
[58] Field of Search ............................ 192/58 B, 82 T; 123/41.12

[56] References Cited

U.S. PATENT DOCUMENTS

| | | | |
|---|---|---|---|
| 3,690,428 | 9/1972 | LaFlame | 192/58 B |
| 4,086,989 | 5/1978 | Spence | 192/58 B |
| 4,570,771 | 2/1986 | Yamaguchi | 192/58 B |
| 4,618,045 | 10/1986 | Storz | 192/58 B |
| 4,653,625 | 3/1987 | Neugebauer | 192/82 T X |
| 4,760,905 | 8/1988 | Gob | 192/58 B |

FOREIGN PATENT DOCUMENTS

| | | |
|---|---|---|
| 0014072 | 8/1980 | European Pat. Off. . |
| 0055122 | 6/1982 | European Pat. Off. . |
| 3122960 | 1/1983 | Fed. Rep. of Germany .... 192/58 B |
| 1029364 | 5/1966 | United Kingdom . |
| 2079414 | 1/1982 | United Kingdom . |
| 2201757 | 9/1988 | United Kingdom . |

*Primary Examiner*—Richard Lorence
*Attorney, Agent, or Firm*—Toren, McGeady & Associates

[57] ABSTRACT

The fluid friction clutch has a clutch cover mounted rotatably in relation to a rotatingly driven input shaft, which cover is divided by a partition into a reservoir for shear fluid and a working chamber. In the working chamber there is arranged a rotor driven in rotation by the input shaft, which rotor together with the partition and the cover defines shear gaps. A valve device controls the inflow of shear fluid in the working chamber. From the internal circumference of the working chamber a baffle body of the cover protrudes inwards into an annular chamber between the internal circumference and the external circumference of the rotor. Behind the baffle body in the drive direction of rotation of the rotor, a transfer opening is provided in the partition. On the side of the baffle body facing the rotation axis (1) an elevated portion of the partition adjoins, which constricts the shear gap between the partition and the rotor. In the circumferential direction the elevated portion overlaps with the transfer opening and prevents the shear fluid built up by the baffle body from flowing radially inwards into the shear gap. The elevated portion increases the pump performance of the baffle body, so that even residual quantities of shear fluid can be pumped away better out of the working chamber and the idling rotation rate of the clutch can be lowered.

9 Claims, 1 Drawing Sheet

Fig. 1
Fig. 2
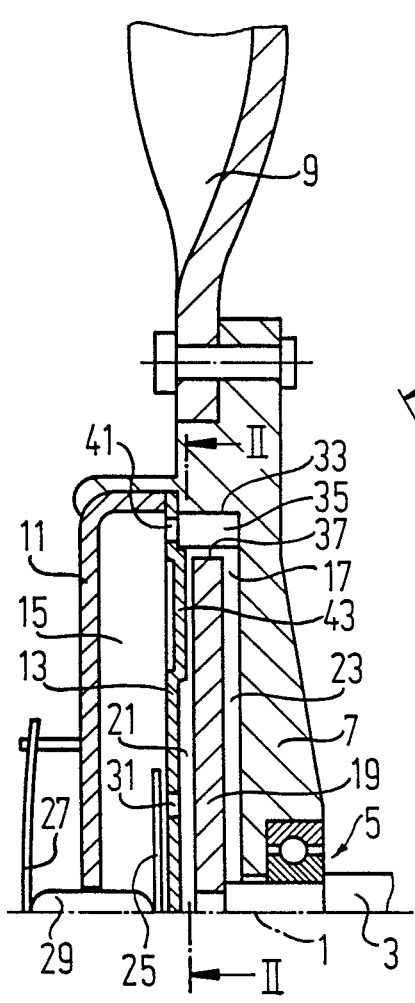
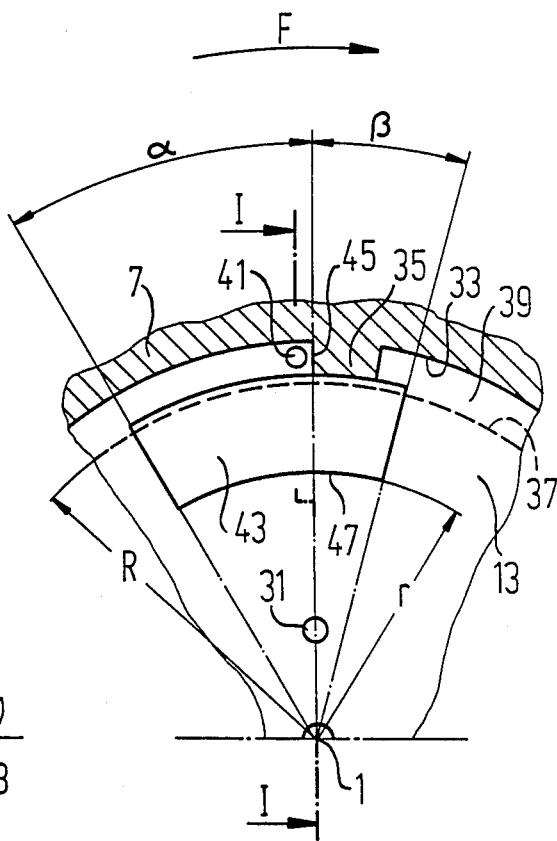

FLUID FRICTION CLUTCH

BACKGROUND OF THE INVENTION

The invention relates to a fluid friction clutch, especially for a radiator fan of an internal combustion engine.

A fluid friction clutch for the radiator fan of an internal combustion engine is known from U.S. Pat. No. 4,086,989. The fluid friction clutch has a clutch cover provided with fan blades, which is rotatably mounted on an input shaft driven in rotation by the internal combustion engine. The cover is divided by a partition axially into a reservoir for shear fluid and a working chamber. In the working chamber there is arranged a rotor of disc form connected with the input shaft, the external circumference of which rotor forms with the cover an annular chamber or gap. The side faces of the rotor with side faces of the cover and the partition form shear gaps which, when they are filled with the viscous shear fluid, couple the rotor with the cover. The clutch is actuated by a valve which, for example temperature-dependently, controls the inflow of shear fluid from the reservoir into the working chamber. At high temperatures the valve opens, so that shear fluid can transfer from the reservoir into the working chamber. At low temperatures the valve is closed and a dynamically working pump device pumps the shear fluid from the working chamber back into the reservoir. The pump device comprises a baffle body held on the cover and extending into the annular chamber formed between the external circumference of the rotor and the internal circumference of the cover. Behind the baffle body, in the drive direction of rotation of the rotor, a shear fluid transfer opening is arranged in the partition in the region of the annular chamber. Since the cover always rotates at a lower rotation rate than the rotor by reason of the slip between cover and rotor, the shear fluid builds up in the annular chamber behind the baffle body and is forced through the transfer opening into the reservoir.

The pump device has to pump the shear fluid away out of the annular chamber against the pressure of the shear fluid in the reservoir. The pressure in the reservoir increases with increasing fluid level or fluid quantity in the reservoir, so that operational situations can occur in which a residual quantity of shear fluid can no longer be pumped away out of the annular chamber. The residual quantity of shear fluid in the working chamber increases the idling rotation rate of the disengaged clutch, which is undesired especially at low temperatures or in a cold-starting of the internal combustion engine. The invention is directed to improve the pump effect of a fluid friction clutch, especially in the case of a small residual volume of shear fluid in the working chamber.

SUMMARY OF THE INVENTION

Within the scope of the invention the partition has, on the side of the baffle body adjacent to the axis of rotation, an elevated portion which reaches into the shear gap between the partition and the rotor and constricts the shear gap. The elevated portion renders more difficult the escape of the shear fluid out of the pump region radially inwards and thus increases the pump performance. The constriction improves the idling properties of the fluid friction clutch, without substantial change to the other performance data.

The elevated portion expediently has the form of a sector of a circular ring, which directly adjoins the side of the baffle body adjacent to the axis of rotation of the rotor and reaches in the circumferential direction at least to the shear fluid transfer opening of the partition. The elevated portion can also extend, in the drive direction of rotation of the rotor, out in the circumferential direction beyond the baffle body. The radial height and the length of the elevated portion in the circumferential direction are expediently so dimensioned that in cold-starting and also idling operation of the clutch a high pump pressure results sufficing for pumping away the remaining quantity of shear fluid. For preference the elevated portion extends contrarily of the drive direction of rotation of the rotor out over an angle of up to about 30° beyond the baffle body, and the radial extent of the elevated portion is preferably so selected that the elevated portion reaches to 75% of the external radius of the rotor on the rotation axis. If the partition is produced from sheet metal, it can be swaged into the sheet metal material for the sake of simpler production.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

An example of embodiment of the invention will be explained in greater detail below with reference to a drawing, wherein:

FIG. 1 shows an axial longitudinal section through one half of a fluid friction clutch for the radiator fan of an internal combustion engine, seen along a line I—I in FIG. 2, and FIG. 2 shows a partial section through the fluid friction clutch, seen along a line II—II in FIG. 1.

DESCRIPTION OF PREFERRED EMBODIMENTS

A clutch cover 7 is coaxially rotatably mounted in a bearing 5 on an input shaft 3 driven by the internal combustion engine about a rotation axis 1. The clutch cover 7 carries fan blades 9 on its external circumference and is closed by a lid 11 on the side axially remote from the input shaft 3. A partition 13 of sheet metal material divides an internal space, formed by the cover 7 and the lid 11, into a reservoir 15 for viscous shear fluid, defined by the lid 11 and the partition 13, and an axially adjacent working chamber 17 defined by the partition 13 and the cover 7. A rotor 19 of substantially disc form is arranged in the working chamber 17. The rotor (19) firmly connected with and driven by the input shaft 3. The mutually opposite side faces of the partition 13 and the rotor 19 on the one hand and the mutually opposite side faces of the rotor 19 and the cover 7 on the other hand form shear gaps 21, 23.

The fluid friction clutch is engaged when the shear gaps 21, 23 are filled with shear fluid from the reservoir 15 and is disengaged when the shear fluid is pumped out of the working chamber 17 back into the reservoir 15. The inflow of shear fluid out of the reservoir 15 into the working chamber 17 is temperature-dependently controlled by a valve 25. The valve 25 is actuated by a bimetallic element 27 through a pin 29 axially displaceably guided in the lid 11, and at elevated temperatures opens an opening 31 in the partition 13, through which shear fluid can transfer from the reservoir 15 into the working chamber 17. At low temperatures the valve 25 closes the opening 31. In the region of the external circumference of the rotor 19 there is provided a dynamically working pump device which continuously pumps the shear fluid out of the working chamber into the reservoir 15 by reason of a relative rotation between the rotor 19 and the cover 7. The pump device empties the working chamber 17 and disengages the clutch when the valve 25 is closed.

The pump device comprises a baffle body 35 protruding radially inwards from the internal circumference 33 of the cover 7. The baffle body (35) reaches into an annular chamber 39 formed in the working chamber between the internal circumference 33 of the cover 7 and the external circumference 37 of the rotor 19. The baffle body 35 builds up the shear fluid in the annular gap 39 by reason of the slip between the cover 7 and the rotor 19, on the side opposite to the drive direction of rotation of the rotor 19 (arrow F). On the side opposite to the drive direction F of rotation a transfer opening 41 is provided in the partition 13 in the region of the annular chamber 39, through which opening the shear fluid of the working chamber 17 is forced into the reservoir 15 by reason of the pressure build-up.

With decreasing filling level in the working chamber 17 the filling level of shear fluid in the reservoir 15 and accordingly the counter-pressure against which the pump device must work increase. Especially at low external temperatures and with the valve 25 closed, a state of equilibrium can establish itself between the delivery pressure of the pump device and the counter-pressure of the shear fluid in the reservoir 15, so that the pump device can no longer pump away a residual volume of shear fluid remaining in the working chamber 17. In an undesired manner the residual volume increases the idling rotation rate of the cover 7. In order that the idling rotation rate may be lowered, an elevated portion 43 of the partition 13 directly adjoins the baffle body 35 towards the rotation axis 3, which elevated portion constricts the shear gap 21 between the partition 13 and the rotor 19. The elevated portion 43, in the example of embodiment as represented, is swaged into the partition 13 and has the form of a sector of a circular ring concentric with the rotation axis 3, and extends contrarily of the drive direction F of rotation of the rotor 19 from the circumferential edge 45, adjacent to the transfer opening 41, of the baffle body 35 over an angle $\alpha$ of up to about 30°. The elevated portion 43 here overlaps the transfer opening 41 on the side towards the rotation axis 3, and renders more difficult the flow of the shear fluid built up in the annular chamber 39 towards the rotation axis 3. In the drive direction F of rotation a smaller extent of the elevated portion 43 corresponding to an angle $\beta$ of up to about 15° suffices. Towards the rotation axis the elevated portion 43 extends with its inner edge 47 as far as a radius r of about 75% of the radius R of the external circumference 37 of the rotor 19. The elevated portion 43 expediently constricts the shear gap 21 to about half of its axial width. It has appeared that with the dimensioning of the elevated portion 43 as described above it is possible to achieve an optimum improvement of the pump effect.

While specific embodiments of the invention have been shown and described in detail to illustrate the application of the inventive principles, it will be understood that the invention may be embodied otherwise without departing from such principles.

What I claim is:

1. Fluid friction clutch, especially for a cooling fan of an internal combustion engine, comprising:
   an input shaft (3) driven in rotation about a rotation axis (1);
   a clutch cover (7) mounted coaxially rotatably in relation to an on the input shaft (3);
   a lid (11) arranged on said cover (7) so as to define an internal space between said lid (11) and said cover (7), said internal space being divided axially by a partition (13) into a reservoir (15) for a shear fluid and a working chamber (17);
   a rotor (19) arranged in the working chamber (17) and connected with the input shaft (3), said rotor (19) having an external circumference (37) and forming an annular chamber (39) with the cover (7), and having side faces which defined shear gaps (21, 23) with side faces of the cover (7) and the partition (13);
   a valve (25) controlling an inflow of shear fluid from the reservoir (15) into the working chamber (17);
   a baffle body (35) held on the cover (7) and extending into the annular chamber (39) between the external circumference (37) of the rotor (19) and an internal circumference (33) of the cover (7);
   a shear fluid transfer opening (41) arranged, in a drive direction of rotation of the rotor (19), downstream of the baffle body (35) in the partition (13) in the region of the annular chamber (39); and
   an elevated portion (43) provided on the partition (13) on the side of the baffle body (35) adjacent to the rotation axis (1), the elevated portion (43) radially inwardly directly adjoining the baffle body (35), said elevated portion (43) reaching into the shear gap (21) between the partition (13) and the rotor (19) and constricting the shear gap (21).

2. A fluid friction clutch according to claim 1, wherein the elevated portion (43) extends, in a direction concentric to the circumference of the cover (7), from the baffle body (35) into the region of the shear fluid transfer opening (41) facing the rotation axis (1).

3. A fluid friction clutch according to claim 2, wherein the elevated portion (43) extends contrarily to the drive direction (F) of rotation of the rotor (19) over an angle ($\alpha$) of about 30° beyond an edge of the baffle body (35) adjacent the opening (41).

4. A fluid friction clutch according to claim 2, wherein the elevated portion (43), on the side of the baffle body (35) opposite to the shear fluid transfer opening (41), extends int eh circumferential direction of the cover (7) from an edge of the baffle body (35) adjacent the opening (41) over an angle ($\beta$) smaller than an angle ($\alpha$) which the elevated portion (43) extends opposite to the drive direction (F) of rotation of the rotor (19).

5. A fluid friction clutch according to claim 1, wherein the elevated portion (43) has an arcuate outer edge concentric with the rotation axis (1).

6. A fluid friction clutch according to claim 5, wherein the elevated portion (43) has a contour in the form of a sector of a circular ring.

7. A fluid friction clutch according to claim 1, wherein the rotor (19) has an external radius (R), the elevated portion (43) having a radially inner edge (47) adjacent to the rotation axis (1) and at a distance (r) from the rotation axis (1) which is greater than 75% of the external radius (R) of the rotor (19).

8. A fluid friction clutch according to claim 1, wherein the shear gap (21) has an axial width with an initial dimension, the elevated portion (43) constricting the axial width of the shear gap (21) between partition (13) and rotor (19) to about half the initial dimension.

9. A fluid friction clutch according to claim 1, wherein the partition (13) consists of sheet metal and the elevated portion (43) is formed as a swaged elevation.

* * * * *